(12) United States Patent
Golan et al.

(10) Patent No.: US 12,147,581 B2
(45) Date of Patent: Nov. 19, 2024

(54) ENABLING WEB BROWSER EXTENSIONS TO PERFORM ASYNCHRONOUS BLOCKING OPERATIONS

(71) Applicant: ISLAND TECHNOLOGY INC., Dallas, TX (US)

(72) Inventors: San Golan, Tel Aviv (IL); Liron Zuaretes, Tel Aviv (IL); Dan Amiga, Ramat Hasharon (IL)

(73) Assignee: ISLAND TECHNOLOGY INC., Dallas, TX (US)

( * ) Notice: Subject to any disclaimer, the term of this patent is extended or adjusted under 35 U.S.C. 154(b) by 226 days.

(21) Appl. No.: 18/080,798

(22) Filed: Dec. 14, 2022

(65) Prior Publication Data
US 2023/0185966 A1      Jun. 15, 2023

Related U.S. Application Data

(60) Provisional application No. 63/289,172, filed on Dec. 14, 2021.

(51) Int. Cl.
*G06F 9/44*      (2018.01)
*G06F 9/54*      (2006.01)
*G06F 21/62*     (2013.01)

(52) U.S. Cl.
CPC ............ *G06F 21/629* (2013.01); *G06F 9/542* (2013.01)

(58) Field of Classification Search
CPC ............................... G06F 21/629; G06F 9/542
See application file for complete search history.

(56) References Cited

U.S. PATENT DOCUMENTS

| | | |
|---|---|---|
| 7,231,523 B1* | 6/2007 | Mathiske ............ H04L 9/3265 713/181 |
| 2001/0020243 A1* | 9/2001 | Koppolu ............... G06F 16/748 715/205 |

(Continued)

FOREIGN PATENT DOCUMENTS

WO    WO-2023053101 A1 *   4/2023   ............. G06F 21/53

OTHER PUBLICATIONS

Zain, et al., "Percival: Making In-Browser Perceptual Ad Blocking Practical With Deep Learning", USENIX Annual Technical Conference 2020, Jul. 15, 2020, pp. 387-400, USENIX: The Advanced Computing Systems Association, Berkeley, CA, USA.

*Primary Examiner* — Jung W Kim
*Assistant Examiner* — Saron Matthewos Worku
(74) *Attorney, Agent, or Firm* — AlphaPatent Associates Ltd.; Daniel J. Swirsky

(57) ABSTRACT

Enabling a web browser extension to perform an asynchronous blocking operation by configuring the web browser to receive from a web browser extension an extension-provided callback function and an indicator, where the extension-provided callback function is configured to perform an asynchronous blocking operation, where the indicator indicates that the extension callback function relates to an asynchronous blocking operation, where the extension-provided callback function is configured to receive a web-browser-provided callback function as a parameter of the extension-provided callback function, and where the extension-provided callback function is configured to call the web-browser-provided callback function after performing the asynchronous blocking operation, and configuring the web browser to call the extension-provided callback function with the web-browser-provided callback function as a parameter of the extension-provided callback function call if (Continued)

the indicator indicates that the extension callback function relates to an asynchronous blocking operation.

4 Claims, 2 Drawing Sheets

(56) References Cited

U.S. PATENT DOCUMENTS

| | | | |
|---|---|---|---|
| 2016/0301735 A1 | 10/2016 | Lind | |
| 2018/0101507 A1* | 4/2018 | Malca | G06F 40/143 |
| 2021/0064685 A1* | 3/2021 | Weizman | G06F 9/3871 |

* cited by examiner

ENABLING WEB BROWSER EXTENSIONS TO PERFORM ASYNCHRONOUS BLOCKING OPERATIONS

BACKGROUND

A browser extension is a set of computer instructions that is provided to a web browser in order to provide the web browser with additional functionality, such as the ability to block advertisements and modify webpage content. One way that web browsers accommodate browser extensions is by providing application programming interfaces (API) that enable browser extensions to monitor certain types of events, such as when a web browser receives a webpage from the Internet, and take certain actions, such as block the webpage from being rendered by the web browser if the browser extension determines that the webpage meets a predefined condition that warrants blocking the webpage. However, current web browser architecture is such that browser extensions are not able to perform asynchronous blocking operations.

SUMMARY

In one aspect of the invention a method is provided for enabling a web browser extension to perform an asynchronous blocking operation, the method including configuring a web browser to receive from a web browser extension an extension-provided callback function and an indicator, where the extension-provided callback function is configured to perform an asynchronous blocking operation, where the indicator indicates that the extension callback function relates to an asynchronous blocking operation, where the extension-provided callback function is configured to receive a web-browser-provided callback function as a parameter of the extension-provided callback function, and where the extension-provided callback function is configured to call the web-browser-provided callback function after performing the asynchronous blocking operation, and configuring the web browser to call the extension-provided callback function with the web-browser-provided callback function as a parameter of the extension-provided callback function call if the indicator indicates that the extension callback function relates to an asynchronous blocking operation.

In another aspect of the invention the method further includes configuring the web browser to call the extension-provided callback function with the web-browser-provided callback function as a parameter of the extension-provided callback function call only after determining that the extension is authorized to perform asynchronous blocking operations.

In another aspect of the invention the method further includes configuring the web browser to receive the extension-provided callback function and the indicator in a request associated with an event that is detectable by the web browser.

In another aspect of the invention the method further includes configuring the web browser to call the call the extension-provided callback function responsive to the web browser detecting the event.

BRIEF DESCRIPTION OF THE DRAWINGS

Aspects of the invention will be understood and appreciated more fully from the following detailed description taken in conjunction with the appended drawings in which.

DETAILED DESCRIPTION

Figure 1A:
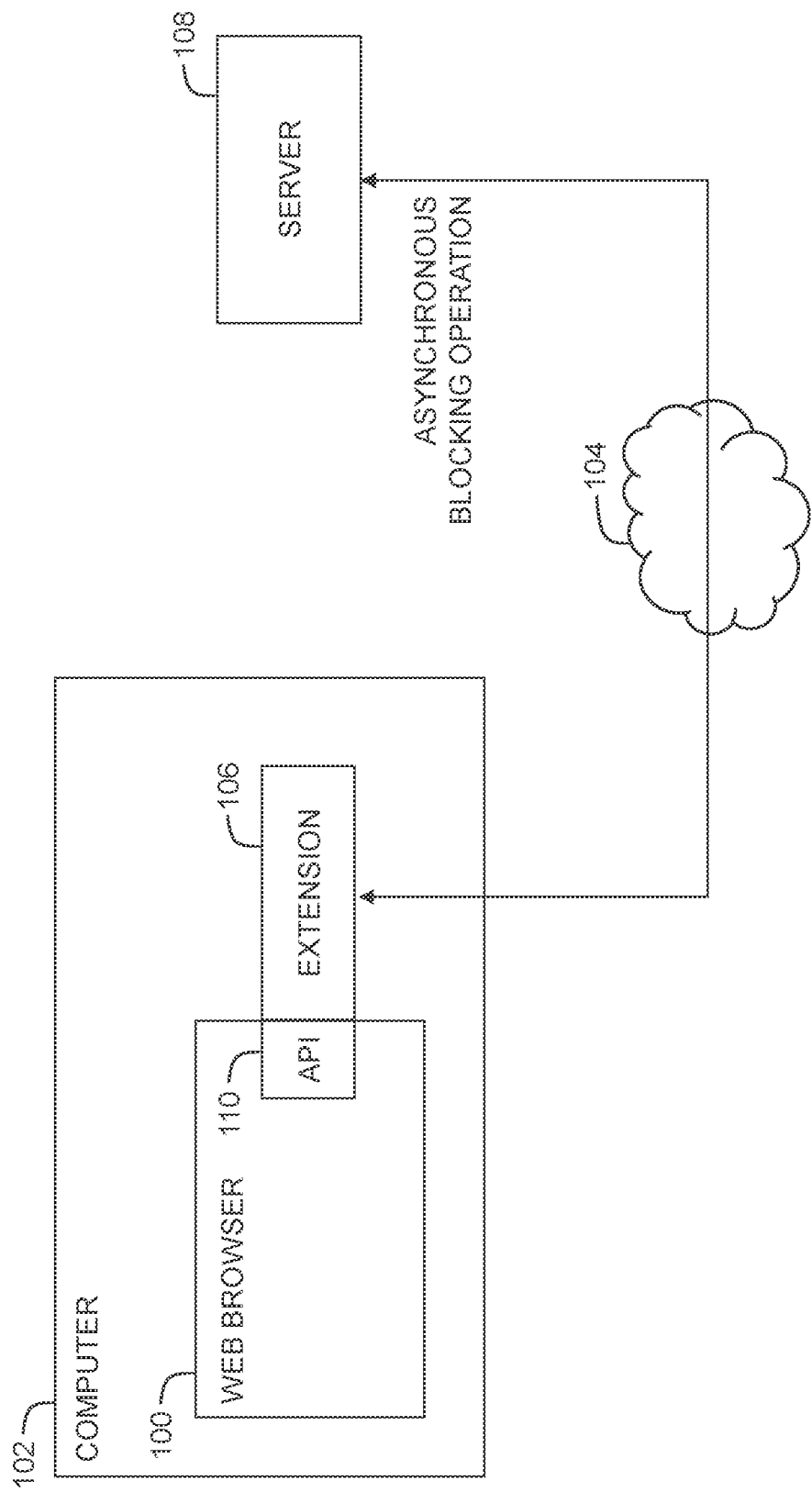
FIG. 1A is a simplified conceptual illustration of a system for enabling web browser extensions to perform asynchronous blocking operations, constructed and operative in accordance with an embodiment of the invention.
Figure 1B:
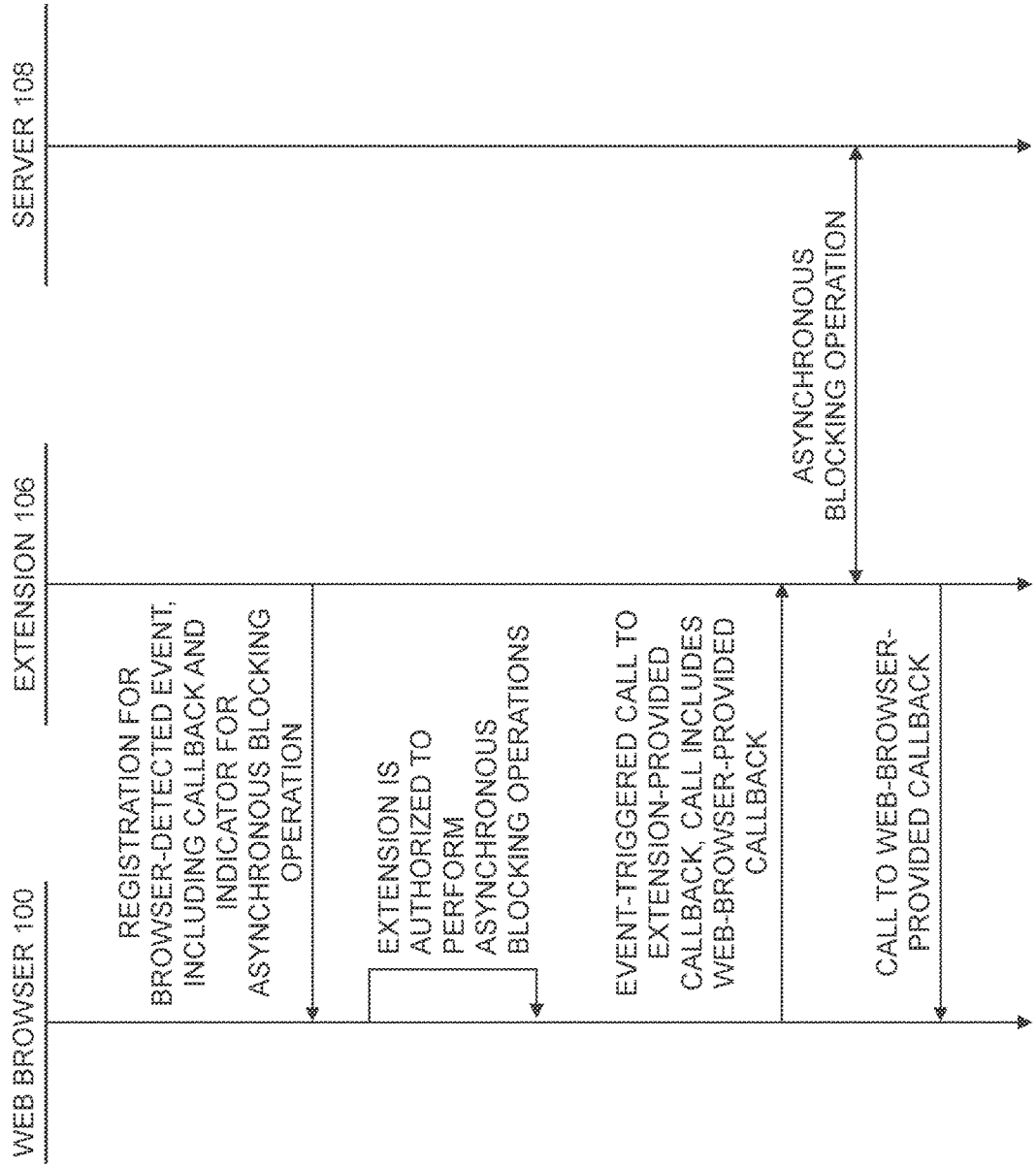
FIG. 1B is a simplified action diagram illustration of an exemplary method of operation of the system of FIG. 1A, operative in accordance with an embodiment of the invention.

Reference is now made to FIG. 1A, which is a simplified conceptual illustration of a system for enabling web browser extensions to perform asynchronous blocking operations, constructed and operative in accordance with an embodiment of the invention, and additionally to FIG. 1B, which is a simplified action diagram of an exemplary method of operation of the system of FIG. 1A, operative in accordance with an embodiment of the invention. In the system of FIG. 1A and method of FIG. 1B, a web browser 100 is configured to incorporate the functionality of conventional web browsers, such as those based on the Google™ Chromium™ architecture, and is additionally configured to operate as is described hereinbelow. Web browser 100 may be hosted by any computing device, such as by a computer 102 that is connected to a computer network 104, such as the Internet. Web browser 100 includes a web browser extension 106 that is configured to perform an asynchronous blocking operation, such as to communicate with a network-based service at a computer server 108 via network 104. Extension 106 interoperates with web browser 100, such as via an application programming interface (API) 110 provided by web browser 100 via which web browser is configured to receive function calls.

Extension 106 provides to web browser 100, such as via an API call to an event listener function associated with an event that is detectable by the web browser, a callback function configured to perform an asynchronous blocking operation, together with an indicator indicating that the extension-provided callback function relates to an asynchronous blocking operation. The extension-provided callback function is configured to receive a web-browser-provided callback function as a parameter of the extension-provided callback function, and is configured to call the web-browser-provided callback function after performing the asynchronous blocking operation.

Web browser 100 is configured to subsequently call the extension-provided callback function, such as when web browser 100 detects the event that is the subject of the event listener function, where the call to the extension-provided callback function includes a web-browser-provided callback function as a parameter if the indicator indicates that the extension-provided callback function relates to an asynchronous blocking operation. Web browser 100 is preferably configured to provide the web-browser-provided callback function to extension 106 only after determining that extension 106 is authorized to perform asynchronous blocking operations, such as in accordance with techniques described in U.S. patent application Ser. No. 17/740,457. The extension-provided callback function then calls the web-browser-provided callback function after performing the asynchronous blocking operation.

In an exemplary implementation of the system of FIG. 1A and method of FIG. 1B using the WebRequest API of Google Chromium™, web browser 100 is configured with custom bindings as follows. The following method is used to install a new event listener:

```
webRequestInternal.addEventListener(
    cb, opt_filter, opt_extraInfo, this.eventName, subEventName,
    this.webViewInstanceId);
....
```
When extension 106 calls the event listener, the code below checks whether the parameters received from extension 106 contain an indicator indicating that the operation performed by extension 106 is a 'blocking' operation. If it is, the method calls the extension-provided callback and immediately resolves the event by calling the 'webRequestInternal.eventHandled' function as it would for a synchronous operation:

```
var subEventCallback = cb;
if (opt_extraInfo && $Array.indexOf(opt_extraInfo, 'blocking') >= 0) {
    ...
    // Not async block - event is handled right away
    var result = $Function.apply(cb, null, arguments);
        webRequestInternal.eventHandled(
            eventName, subEventName, requestId,
    webViewInstanceId, result);
```

However, if the parameters received from extension 106 contain an indicator indicating that the operation performed by extension 106 is an 'asyncBlocking' operation, the method calls the extension-provided callback and passes the 'eventHandled' function as a callback to extension 106 within the call as follows:

```
opt_extraInfo && $Array.indexOf(opt_extraInfo, 'asyncBlocking') >= 0) {
    var handledCallback = function(response) {
        webRequestInternal.eventHandled(
            eventName, subEventName, requestId,
webViewInstanceId, response);
    };
    // Async block - callback is passed as an argument
    $Function.apply(cb, null, [details, handledCallback]);
    };
}
```

Extension 106 then performs its asynchronous blocking operation and calls the 'eventHandled' function once the operation has been completed.

For its part, extension 106 is configured to call an event listener using API 110, such as using the following code:

```
chrome.webRequest.onBeforeRequest.addListener(
    function(details, callback) {
        // async operation
        ...
        callback(AsyncBlockingResponse)
    },
    {urls: ["<url_filter_pattern>"]},
    ["asyncBlocking"]
);
```

Some exemplary applications of the system of FIG. 1A and method of FIG. 1B include:

Configuring an async proxy for each web request/response, where network requests are intercepted and the Google Chromium™ NativeMessagingHost is used to send a message to an agent which edits the network requests;

Modifying the headers and/or payload of a network communication (i.e., changing the User-Agent) using an external service, where a communication is sent to an external third-party service for decision making, and then the headers and/or payload are modified according to the third-party response;

Performing Multi-factor Authentication (MFA) on certain operations, where human interaction and/or an I/O operation is required to allow/block network requests. For example, intercepting a form submission and blocking the submission until the user performs multi-factor authentication;

Reporting requested data and user activity to a third-party logging system for auditing purposes. For example, logging every external URL under a specified domain that is called by the browser;

Reporting network performance metrics to an external monitoring system;

Redirect certain network requests to an external web service that will decides whether to redirect or proceed with the original request;

Data loss prevention (DLP) and content scanning that requires intensive computing and/or I/O operations;

Require administrative approval before proceeding with a specific network request.

Any aspect of the invention described herein may be implemented in computer hardware and/or computer software embodied in a non-transitory, computer-readable medium in accordance with conventional techniques, the computer hardware including one or more computer processors, computer memories, I/O devices, and network interfaces that interoperate in accordance with conventional techniques.

It is to be appreciated that the term "processor" or "device" as used herein is intended to include any processing device, such as, for example, one that includes a CPU (central processing unit) and/or other processing circuitry. It is also to be understood that the term "processor" or "device" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Such memory may be considered a computer readable storage medium.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

Embodiments of the invention may include a system, a method, and/or a computer program product. The computer program product may include a computer readable storage medium (or media) having computer readable program instructions thereon for causing a processor to carry out aspects of the invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the invention.

Aspects of the invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart illustrations and block diagrams in the drawing figures illustrate the architecture, functionality, and operation of possible implementations of systems, methods, and computer program products according to various embodiments of the invention. In this regard, each block in the flowchart illustrations or block diagrams may represent a module, segment, or portion of computer instructions, which comprises one or more executable computer instructions for implementing the specified logical function(s). In some alternative implementations, the functions noted in a block may occur out of the order noted in the drawing figures. For example, two blocks shown in succession may, in fact, be executed substantially concurrently, or the blocks may sometimes be executed in the reverse order, depending upon the functionality involved. It will also be noted that each block of the flowchart illustrations and block diagrams, and combinations of such blocks, can be implemented by special-purpose hardware-based and/or software-based systems that perform the specified functions or acts.

The descriptions of the various embodiments of the invention have been presented for purposes of illustration, but are not intended to be exhaustive or limited to the embodiments disclosed. Many modifications and variations will be apparent to those of ordinary skill in the art without departing from the scope and spirit of the described embodiments.

What is claimed is:

1. A method for enabling a web browser extension to perform an asynchronous blocking operation, the method comprising:

configuring a web browser to receive from a web browser extension an extension-provided callback function and an indicator, wherein the extension-provided callback function is configured to perform an asynchronous blocking operation, wherein the indicator indicates that the extension callback function relates to the asynchronous blocking operation, wherein the extension-provided callback function is configured to receive a web-browser-provided callback function as a parameter of the extension-provided callback function, and wherein the extension-provided callback function is configured to call the web-browser-provided callback function after performing the asynchronous blocking operation; and configuring the web browser to call the extension-provided callback function with the web-browser-provided callback function as a parameter of the extension-provided callback function call if the indicator indicates that the extension callback function relates to an asynchronous blocking operation.

2. The method according to claim 1 and further comprising configuring the web browser to call the extension-provided callback function with the web-browser-provided callback function as a parameter of the extension-provided callback function call only after determining that the extension is authorized to perform asynchronous blocking operations.

3. The method according to claim 1 and further comprising configuring the web browser to receive the extension-provided callback function and the indicator in a request associated with an event that is detectable by the web browser.

4. The method according to claim 3 and further comprising configuring the web browser to call the extension-provided callback function responsive to the web browser detecting the event.

* * * * *